US007091911B2

(12) United States Patent
Qi et al.

(10) Patent No.: US 7,091,911 B2
(45) Date of Patent: Aug. 15, 2006

(54) MOBILE WIRELESS COMMUNICATIONS DEVICE COMPRISING NON-PLANAR INTERNAL ANTENNA WITHOUT GROUND PLANE OVERLAP

(75) Inventors: Yihong Qi, Waterloo (CA); Ying Tong Man, Kitchener (CA); Perry Jarmuszewski, Waterloo (CA)

(73) Assignee: Research In Motion Limited, Ontario (CA)

( * ) Notice: Subject to any disclaimer, the term of this patent is extended or adjusted under 35 U.S.C. 154(b) by 0 days.

(21) Appl. No.: 11/042,890

(22) Filed: Jan. 25, 2005

(65) Prior Publication Data
US 2005/0270242 A1 Dec. 8, 2005

Related U.S. Application Data

(60) Provisional application No. 60/576,159, filed on Jun. 2, 2004, provisional application No. 60/576,637, filed on Jun. 3, 2004.

(51) Int. Cl.
*H01Q 1/24* (2006.01)
(52) U.S. Cl. .............................. 343/702; 343/700 MS; 343/866
(58) Field of Classification Search ......... 343/700 MS, 343/702, 866, 846
See application file for complete search history.

(56) References Cited

U.S. PATENT DOCUMENTS

| 4,571,595 A | 2/1986 | Phillips et al. ............... 343/745 |
| 4,723,305 A | 2/1988 | Phillips et al. ................ 455/89 |
| 5,337,061 A | 8/1994 | Pye et al. .................... 343/702 |
| 5,451,965 A | 9/1995 | Matsumoto .................. 343/702 |
| 5,557,293 A | 9/1996 | McCoy et al. ............... 343/867 |
| 5,973,650 A | 10/1999 | Nakanishi .................... 343/742 |
| 6,008,774 A | 12/1999 | Wu ............................. 343/828 |
| 6,031,505 A | 2/2000 | Qi et al. ...................... 343/795 |
| 6,124,831 A * | 9/2000 | Rutkowski et al. .. 343/700 MS |
| 6,147,649 A | 11/2000 | Ivrissimtzis et al. . 343/700 MS |
| 6,198,442 B1 | 3/2001 | Rutkowski et al. ......... 343/702 |
| 6,239,765 B1 | 5/2001 | Johnson et al. ............. 343/795 |
| 6,271,796 B1 | 8/2001 | Itoh et al. ................... 343/702 |
| 6,307,511 B1 | 10/2001 | Ying et al. .................. 343/702 |
| 6,329,951 B1 | 12/2001 | Wen et al. ................... 343/702 |
| 6,337,663 B1 | 1/2002 | Chi-Ming .................... 343/702 |

(Continued)

FOREIGN PATENT DOCUMENTS

CA 2 489 837 12/2003

(Continued)

OTHER PUBLICATIONS

*Film type inverted F antenna*, Honda Tsushin Kogyo Co., Ltd., Jun. 17, 2003.

(Continued)

*Primary Examiner*—Hoang V. Nguyen
(74) *Attorney, Agent, or Firm*—Allen, Dyer, Doppelt, Milbrath & Gilchrist, P.A.

(57) ABSTRACT

A mobile wireless communications device may include a housing, a main dielectric substrate carried by the housing, circuitry carried by the main dielectric substrate, and a ground plane conductor on the main dielectric substrate. The mobile wireless communications device may further include an L-shaped dielectric extension comprising a vertical portion extending outwardly from the main dielectric substrate and an overhang portion extending outwardly from the vertical portion and above an adjacent portion of the main dielectric layer. A main loop antenna conductor comprising at least one conductive trace may be relatively positioned on the overhang portion of the L-shaped dielectric extension so as not to overlap the ground plane conductor.

20 Claims, 11 Drawing Sheets

U.S. PATENT DOCUMENTS

| | | |
|---|---|---|
| 6,343,208 B1 | 1/2002 | Ying .......................... 455/90 |
| 6,388,626 B1 | 5/2002 | Gamalielsson et al. ..... 343/702 |
| 6,408,190 B1 | 6/2002 | Ying .......................... 455/553 |
| 6,417,816 B1 | 7/2002 | Sadler et al. ............... 343/795 |
| 6,452,556 B1 | 9/2002 | Ha et al. .................... 343/702 |
| 6,459,413 B1 | 10/2002 | Tseng et al. ................ 343/702 |
| 6,466,176 B1 | 10/2002 | Maoz et al. ................ 343/767 |
| 6,563,466 B1 | 5/2003 | Sadler et al. ............... 343/702 |
| 6,614,400 B1 | 9/2003 | Egorov ....................... 343/702 |
| 6,628,236 B1 | 9/2003 | Kim et al. ................... 343/702 |
| 6,650,294 B1 | 11/2003 | Ying et al. ........... 343/700 MS |
| 6,664,930 B1 | 12/2003 | Wen et al. .................. 343/702 |
| 6,677,907 B1 | 1/2004 | Shoji et al. ................. 343/702 |
| 6,693,604 B1 | 2/2004 | Washiro et al. ............. 343/895 |
| 6,717,551 B1 | 4/2004 | Desclos et al. .............. 343/700 |
| 6,738,023 B1 | 5/2004 | Scott et al. .......... 343/700 MS |
| 6,741,215 B1 | 5/2004 | Grant et al. ................. 343/702 |
| 6,806,835 B1 | 10/2004 | Iwai et al. .................. 343/702 |
| 2002/0033772 A1 | 3/2002 | Johnson et al. ............. 343/702 |
| 2003/0137461 A1 | 7/2003 | Peng .......................... 343/702 |
| 2004/0090372 A1 | 5/2004 | Nallo et al. ................ 343/700 |
| 2004/0100411 A1* | 5/2004 | Baker ......................... 343/702 |
| 2004/0130493 A1 | 7/2004 | Horita et al. ............... 343/702 |

FOREIGN PATENT DOCUMENTS

WO     WO0067342     11/2000

OTHER PUBLICATIONS

*Dual Band Printed Antenna for Mobile Telephones*, Department of Electronics, University of Kent, 2003.

Karaboikis et al., *Compact Dual Printed Inverted F Antenna Diversity Systems for Portable Wireless Devices*, IEEE Antennas and Wireless Propagation Letters, vol. 3, Issue 2, pp. 9-14, 2004.

* cited by examiner

MOBILE WIRELESS COMMUNICATIONS DEVICE COMPRISING NON-PLANAR INTERNAL ANTENNA WITHOUT GROUND PLANE OVERLAP

CROSS-REFERENCE TO RELATED APPLICATIONS

This application claims the benefit of U.S. Provisional Application No. 60/576,159 filed Jun. 2, 2004, and No. 60/576,637, filed Jun. 3, 2004, both of which are hereby incorporated herein in their entireties by reference.

FIELD OF THE INVENTION

The present invention relates to the field of communications devices, and, more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. As a result, one style of cellular telephones which has gained wide popularity is the folding or "flip" phone. Flip phones typically have an upper housing with a display and speaker, and a lower housing or flap which carries the microphone. The keypad on such phones may be on either the upper housing or the lower housing, depending upon the particular model. The lower flap is connected to the upper housing by a hinge so that when not in use the upper and lower housings can be folded together to be more compact.

One example of a flip phone is disclosed in U.S. Pat. No. 5,337,061 to Pye et al. The phone has two antennas, a first one of which is mounted on the lower flap and includes a ground plane and an active monopole fed by a coaxial feed from electronic circuitry inside the phone. The flap is pivotally connected to the main or upper section of the housing, and is folded against the main section when not in use. Another similar antenna is fitted in the main section, and both antennas are connected to transceiver circuitry in the phone. The antennas are designed to introduce deliberate mismatch to provide an effective switching system between the antennas without the need for separate circuit elements.

The antenna configuration of a cellular telephone may also significantly effect the overall size or footprint of the phone. Cellular telephones typically have antenna structures that support communications in multiple operating frequency bands. Various types of antennas for mobile devices are used, such as helix, "inverted F", folded dipole, and retractable antenna structures, for example. Helix and retractable antennas are typically deployed outside, i.e., on the exterior of, a mobile device, and inverted F and folded dipole antennas are typically within (i.e., on the interior of) a mobile device case or housing adjacent the top thereof.

Generally speaking, internal antennas allow cell phones to have a smaller footprint than do external antennas. Moreover, they are also are preferred over external antennas for mechanical and ergonomic reasons. Internal antennas are also protected by the mobile device housing and therefore tend to be more durable than external antennas. External antennas may be cumbersome and make the mobile device difficult to use, particularly in limited-space environments.

Yet, one potential drawback of typical internal cellular phone antennas is that they are in relatively close proximity to the user's head when the phone is in use. As an antenna moves closer to a user's body, the amount of radio frequency (RF) energy radiation absorbed by the body will typically increase. The amount of RF energy absorbed by a body when using a mobile phone is called the specific absorption rate (SAR), and the allowable SAR for mobile phones is typically limited by applicable government regulations to ensure safe user RF energy exposure levels.

One attempt to reduce radiation exposure from cell phone antennas is set forth in U.S. Pat. No. 6,741,215 to Grant et al. This patent discloses various cellular phones with internal and external antenna configurations in which the antennas are positioned at the bottom of the phone to reduce radiation intensity experienced by a user, i.e., by moving the antenna farther away from the user's brain. Further, in some embodiments the housing of the phone forms an obtuse angle so that the bottom portion of the housing angles away from the user's face.

Despite such antenna configurations which allow for reduced radiation exposure, further advancements in antenna configurations, particularly internal antennas, may be desirable to allow for further reductions in overall device size while still providing relatively low SAR values.

SUMMARY OF THE INVENTION

In view of the foregoing background, it is therefore an object of the present invention to provide a mobile wireless communications device including an antenna configuration which allows for relatively small device sizes, yet provides desired performance and relatively low SAR values.

This and other objects, features, and advantages in accordance with the present invention are provided by a mobile wireless communications device which may include a housing, a main dielectric substrate carried by the housing, circuitry carried by the main dielectric substrate, and a ground plane conductor on the main dielectric substrate. Moreover, the mobile wireless communications device may further include an L-shaped dielectric extension comprising a vertical portion extending outwardly from the main dielectric substrate and an overhang portion extending outwardly from the vertical portion and above an adjacent portion of the main dielectric substrate. Further, a main loop antenna conductor comprising at least one conductive trace may be relatively positioned on the overhang portion of the L-shaped dielectric extension so as not to overlap the ground plane conductor to advantageously provide enhanced antenna performance characteristics.

More particularly, the main dielectric substrate may have opposing first and second surfaces, the ground plane conductor may be on the first surface, and the vertical portion of the L-shaped dielectric extension may extend outwardly from the second surface. Furthermore, the at least one conductive trace may extend over the vertical portion of the L-shaped dielectric extension and have a gap therein defining first and second ends of the main loop antenna conductor. Moreover, the device may further include a first branch conductor on the main dielectric substrate having a first end connected adjacent the first end of the main loop antenna conductor and having a second end defining a first feed point, and a second branch conductor on the main dielectric substrate having a first end connected adjacent the second end of the main loop antenna conductor and a second end defining a second feed point. In addition, a tuning branch conductor may be on the main dielectric substrate and may be connected to the main loop antenna conductor between the respective first ends of the first and second branches.

The main loop antenna conductor may have at least one tuning feature therein. Further, the housing may have an upper portion and a lower portion, and an audio output transducer may be carried by the upper portion of the housing and connected to the circuitry. The L-shaped dielectric extension may be adjacent the lower portion of the housing to reduce the SAR associated with the device, for example. Also, the circuitry may include a wireless transceiver connected to the main loop antenna conductor.

A method aspect of the invention is for making a mobile wireless communications device and may include forming an L-shaped dielectric extension comprising a vertical portion and an overhang portion extending outwardly from the vertical portion, with at least one conductive trace on the overhang portion. The method may further include connecting the vertical portion of the L-shaped dielectric extension to a main dielectric substrate so that the vertical portion extends outwardly therefrom, the overhang portion extends above an adjacent portion of the main dielectric substrate, and the at least one conductive trace does not overlap a ground plane conductor on the dielectric substrate. Further, the main dielectric substrate may be mounted in a housing of the mobile wireless communications device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
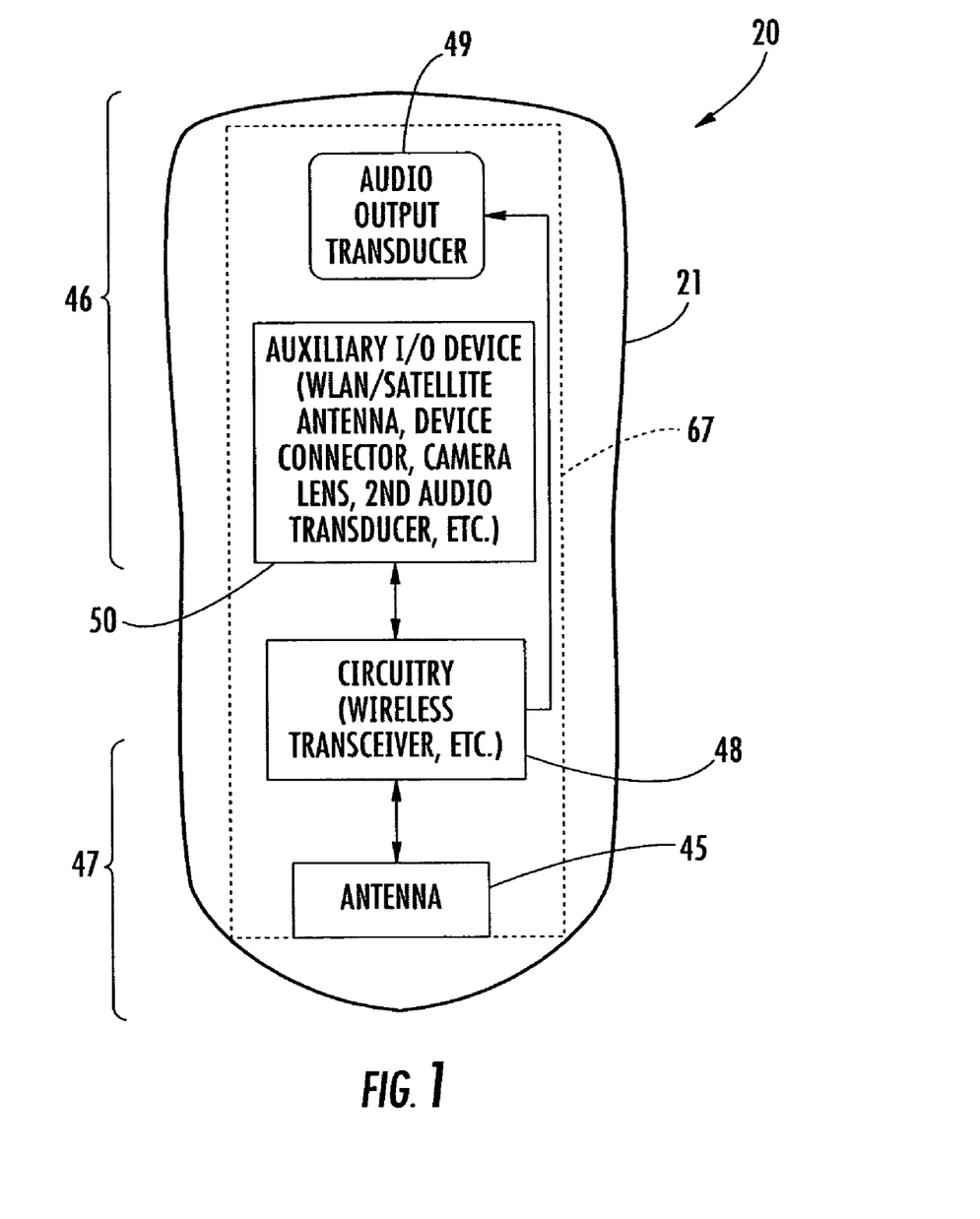
FIG. 1 is a schematic block diagram of a mobile wireless communications device in accordance with the present invention illustrating certain internal components thereof.
Figure 2:
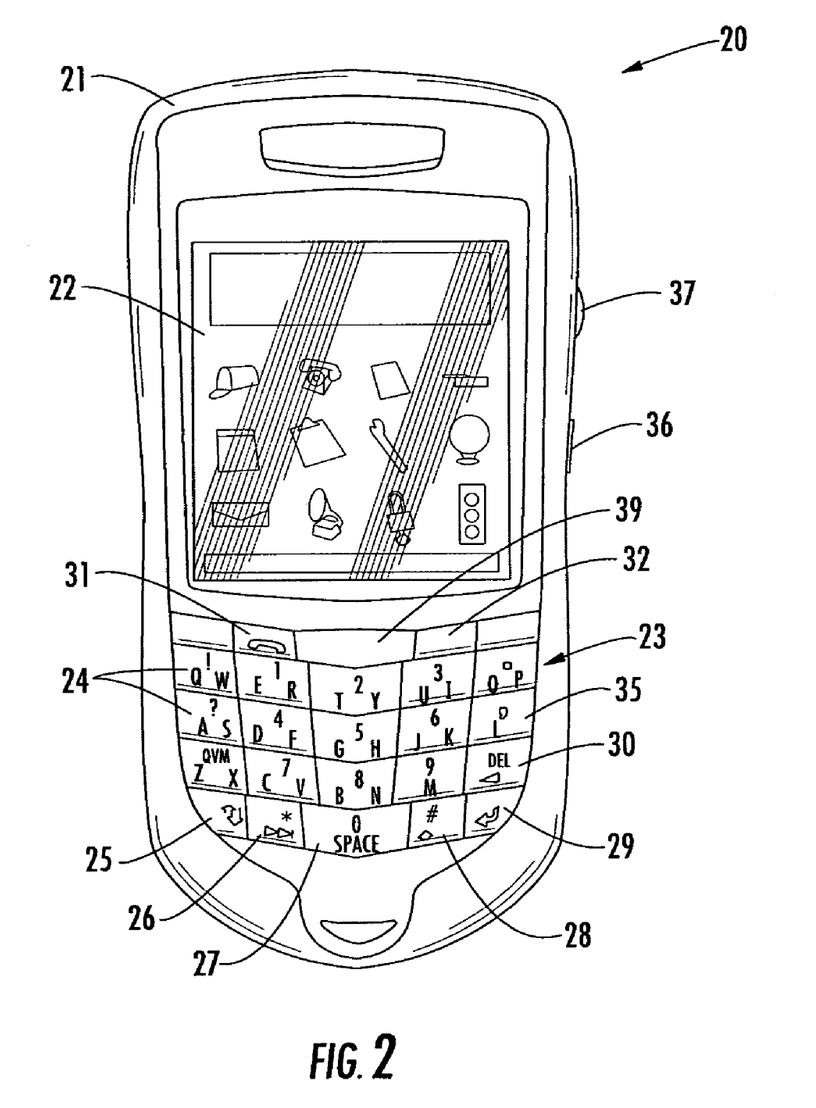
FIG. 2 is a front elevational view of the mobile wireless communications device of FIG. 1.

Referring initially to FIGS. 1 and 2, a mobile wireless communications device, such as a mobile cellular device 20, in accordance with the present invention is first described. The cellular device 20 illustratively includes a housing 21 having an upper portion 46 and a lower portion 47, and a main dielectric substrate 67, such as a printed circuit board (PCB) substrate, for example, carried by the housing. The illustrated housing 21 is a static housing, for example, as opposed to a flip or sliding housing which are used in many cellular telephones. However, these and other housing configurations may also be used.

Various circuitry 48 is carried by the dielectric substrate 67, such as a microprocessor, memory, one or more wireless transceivers (e.g., cellular, WLAN, etc.), audio and power circuitry, etc., as will be appreciated by those skilled in the art, and as will be discussed further below. A battery (not shown) is also preferably carried by the housing 21 for supplying power to the circuitry 48.

Furthermore, an audio output transducer 49 (e.g., a speaker) is carried by the upper portion 46 of the housing 21 and connected to the circuitry 48. One or more user input interface devices, such as a keypad 23, is also preferably carried by the housing 21 and connected to the circuitry 48. Other examples of user input interface devices include a scroll wheel 37 and a back button 36. Of course, it will be appreciated that other user input interface devices (e.g., a stylus or touch screen interface) may be used in other embodiments.

The cellular device 20 further illustratively includes an antenna 45 carried within the lower portion 47 of the housing 21 comprising a pattern of conductive traces on the dielectric substrate 67, as will be discussed further below. By placing the antenna 45 adjacent the lower portion 47 of the housing 21, this advantageously increases the distance between the antenna and the user's head when the phone is in use to aid in complying with applicable SAR requirements.

More particularly, a user will typically hold the upper portion of the housing 21 very close to his head so that the audio output transducer 49 is directly next to his ear. Yet, the lower portion 47 of the housing 21 where an audio input transducer (i.e., microphone) is located need not be placed directly next to a user's mouth, and is typically held away from the user's mouth. That is, holding the audio input transducer close to the user's mouth may not only be uncomfortable for the user, but it may also distort the user's voice in some circumstances. In addition, the placement of the antenna 45 adjacent the lower portion 47 of the housing 21 also advantageously spaces the antenna farther away from the user's brain.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22 carried by the housing 21 and connected to the circuitry 48. The back button 36 and scroll wheel 37 are also connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. That is, the letters on the keypad 23 are presented in a three-row format, with the letters of each row being in the same order and relative position as in a standard QWERTY keypad.

Each row of keys (including the fourth row of function keys 25–29) are arranged in five columns. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile cellular device 20 may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

Exemplary implementations of the antenna 45 are now discussed with reference to FIGS. 3 through 10. The antenna 45 is preferably a multi-frequency band antenna which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well.

To conserve space, the antenna 45 may advantageously be implemented in three dimensions, as seen in FIGS. 7 through 10, although it may be implemented in two-dimensional or planar embodiments as well. The antenna 45 illustratively includes a first section 61 on the PCB 67. A second section 62 wraps around from the PCB 67 onto an L-shaped dielectric extension or antenna retainer frame 63 which includes a vertical portion 51 extending outwardly from the PCB 67, and an overhang portion 68 extending outwardly from the vertical portion and above an adjacent portion of the PCB. In some embodiments, sidewalls 55 may also be positioned on opposing ends of the L-shaped dielectric extension 63 to provide additional support, if desired (see FIGS. 7 and 9).

Figure 3:
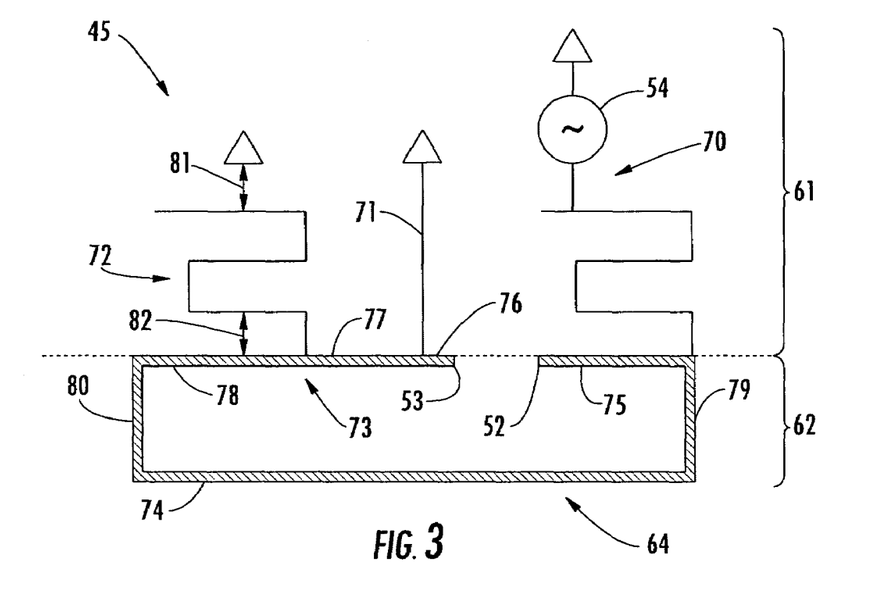
FIG. 3 is a schematic diagram generally illustrating a multi-frequency band antenna for the mobile wireless communications device of FIG. 1.
Figure 4A:
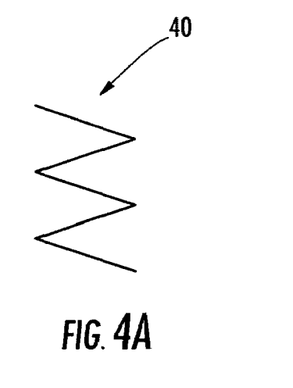
FIGS. 4–6 are schematic diagrams of different embodiments of tuning features which may be used in various portions of the antenna of FIG. 3.
Figure 4B:
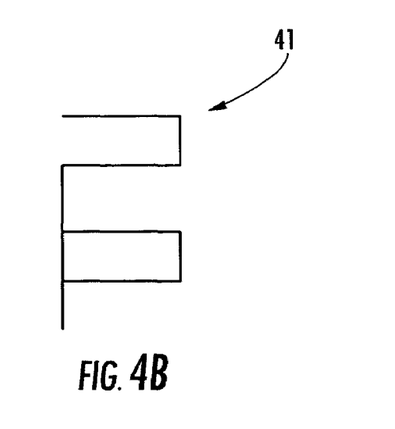
Figure 8:
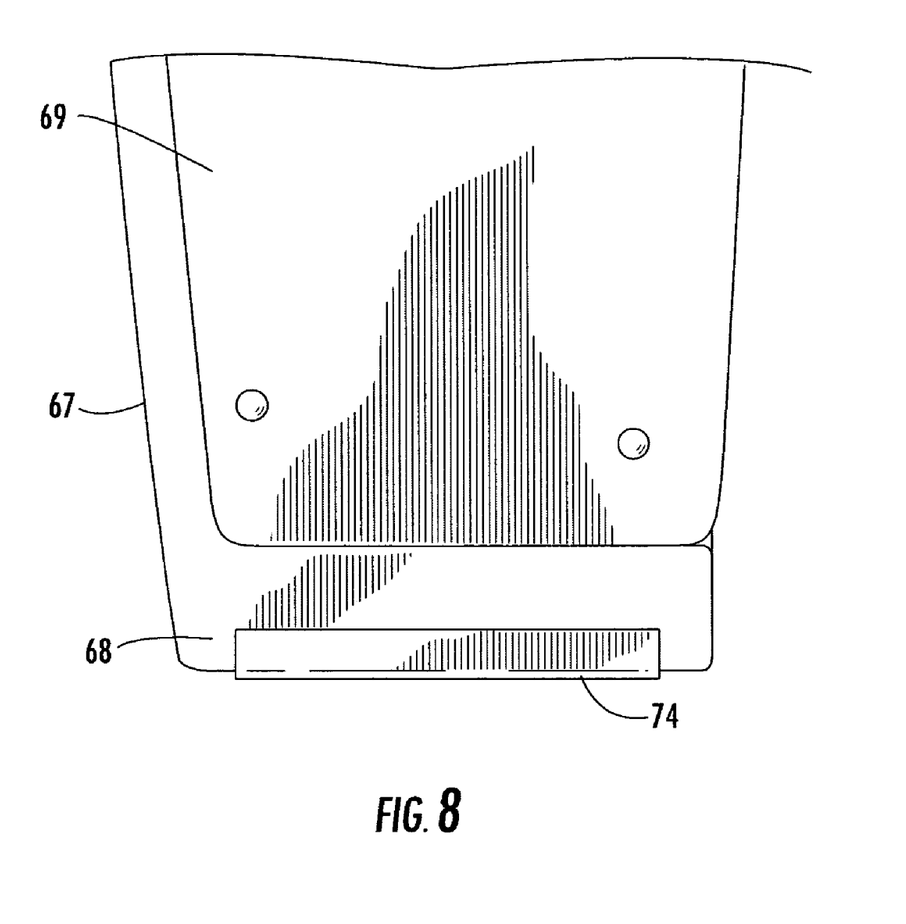
FIG. 8 is a rear elevational view of the dielectric substrate of FIG. 7.
Figure 9:
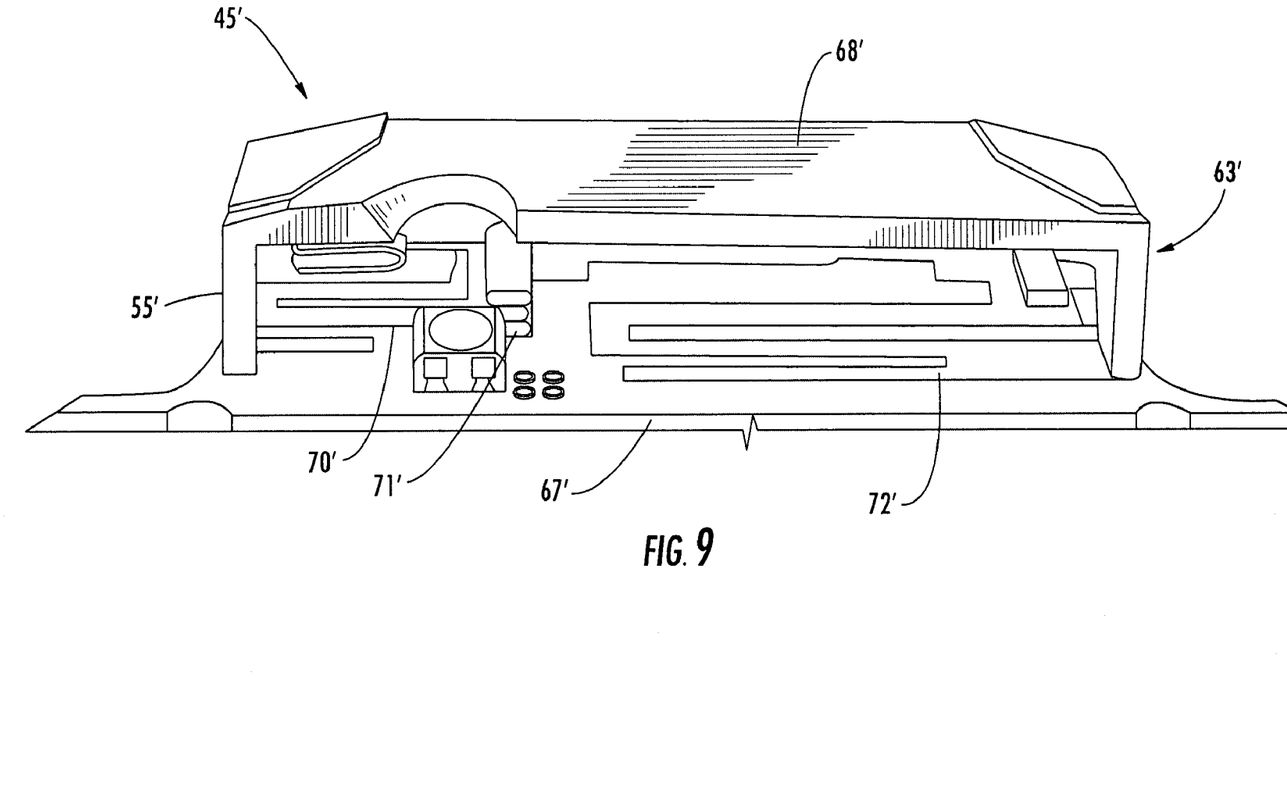
FIGS. 9 and 10 are perspective views of another embodiment of a dielectric substrate and associated antenna for use in the mobile wireless communications device shown from the top of the substrate looking down, and from the bottom of the substrate looking up, respectively.
Figure 10:
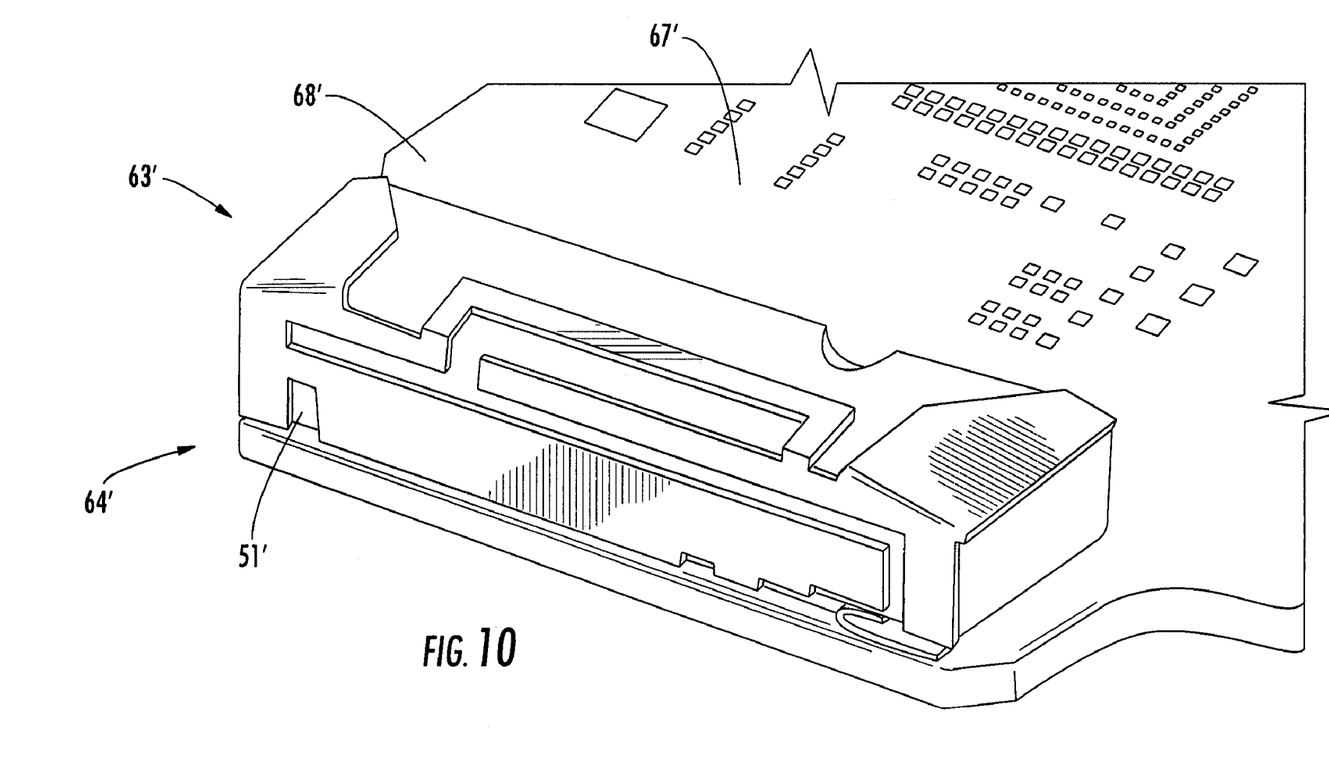

The second section 62 of the antenna 45 illustratively includes a main loop antenna conductor 64 having a gap therein defining first and second ends 52, 53 of the main loop conductor. The first section 61 of the antenna 45 illustratively includes a first branch conductor 70, a second branch conductor 71, and a tuning branch conductor 72. More particularly, the first branch conductor 70 has a first end connected adjacent the first end 52 of the main loop conductor 64, and a second end defining a first feed point, which in the illustrated example is connected to a signal source 54 (e.g., a wireless transceiver). The second branch conductor 71 has a first end connected adjacent the second end 53 of the main loop conductor 64 and a second end defining a second feed point, which in the illustrated example is connected to a ground plane conductor 69 of the PCB (FIG. 8).

The tuning branch conductor 72 has a first end connected to the main loop conductor 64 between the respective first ends of the first and second branches. That is, the first end of the tuning branch conductor 72 is connected to the main loop conductor 64 at some point along the length thereof between the first and second branch conductors 70, 71. The position of the branch 72 between sections 77 and 78 may conveniently be varied without significant effect on frequency parameters. In the present example, the main loop conductor 64 has a generally rectangular shape with a first side including segments 75–78 and the gap, an opposing second side 74, and opposing first and second ends 79, 80. The first and second sections 61, 62 of the antenna 45 may be formed using printed or patterned conductive circuit traces, as seen in FIGS. 7–10.

While the respective first ends of the first branch conductor 70, the second branch conductor 71, and the tuning branch conductor 72 are connected to the first side of the main loop conductor 64 in the illustrated embodiment, other configurations are also possible. For example, the first end of the tuning branch conductor 72 may be connected to the second side 74 or either of the first and second ends 79, 80.

As noted above, the second section 62 of the antenna 45 may be positioned on the vertical portion 51 of the L-shaped dielectric extension 63. This advantageously allows the overall footprint of the antenna 45 on the top (i.e., circuitry) side of the PCB 67 to be significantly reduced. Moreover, portions of the main loop conductor 64 may also wrap around onto the overhang portion 68 of the dielectric extension 63 to provide still further space savings. It should be noted, however, that the antenna 45 may be implemented in two dimensions (i.e., where the first and second sections 61, 62 are in the same plane), in certain embodiments if enough space is available, and that other 3D configurations are also possible, as will be appreciated by those skilled in the art.

The main loop conductor 64 is defined by sections 74–80. The first branch conductor 70 may be connected to the signal source 54 with or without a passive matching network, as will be appreciated by those skilled in the art. The second branch conductor 71 is preferably connected to ground without a matching network, and the tuning branch conductor 72 is floating (i.e., not connected to the signal source 54 or ground).

Generally speaking, the length of branches 70, 71, and 72 are used to set the center frequency of operation. The square meandering or back-and-forth patterns of the branch conductors 70 and 72 is a tuning feature which can be used to change electric length, which varies the center frequency. Moreover, different shapes (i.e., tuning features) of the branches 70, 71, 72 may also be used to provide different frequencies. For example, in addition to the meandering and straight-line shapes illustrated in FIG. 3, other geometries which may be used for these branches include a saw-toothed or triangular meander 40 (FIG. 4A), a branch 41 with a loop (FIG. 4B), etc. Various other shapes and combinations thereof may also be used to provide different frequency characteristics, as will be appreciated by those skilled in the art.

Figure 5A:
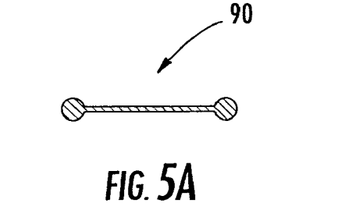
Figure 5B:
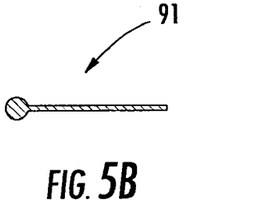
Figure 5C:
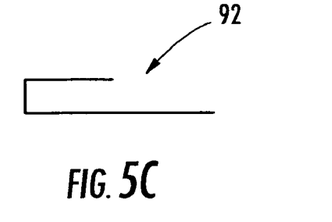
Figure 5D:
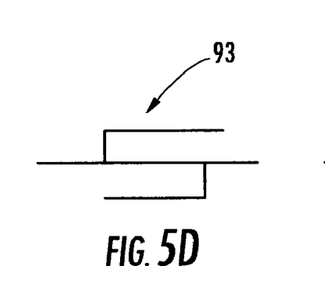
Figure 5E:
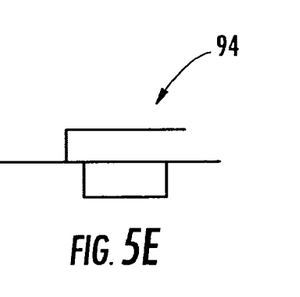
Figure 5F:
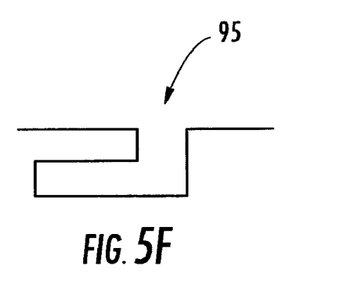
Figure 5G:
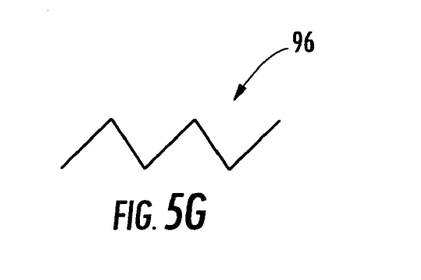

The section 73 of the main loop conductor 64 may also be used to control operating frequency. A variety of shapes and/or cut-outs may be used for the section 73. Such tuning features may include, for example, a "dog bone" 90 (FIG. 5A), a half dog bone 91 (FIG. 5B), a hairpin 92 (FIG. 5C), a double hairpin 93 (FIG. 5D), a hairpin with a loop 94 (FIG. 5E), a meander 95 (FIG. 5F), and a sawtooth 96 (FIG. 5G). Moreover, in some embodiments the entire main loop conductor 64 may take one of the foregoing shapes or others, rather than just a section(s) thereof.

If an circuit element is needed in certain embodiments to adjust input impedance and/or widen bandwidth, a loop type pattern may be used, which creates an additional resonant tuning stage, as will be appreciated by those skilled in the art. If adequate space is available, straight-line portions may be used in the appropriate length. Yet, space is typically at a premium for internal cellular device antennas, and particularly so for compact models, and thus one of the above-described shapes (or others) will likely be preferred.

The width and shape of the section 74 influences antenna gain. The length of section 74 also impacts the operating frequency. However, it should be noted that the lengths of the sections 70, 71, 72, and 73 (i.e., the length of the entire antenna 45) also affects the operating frequency, as is the case with a typical dipole antenna.

Figure 6A:
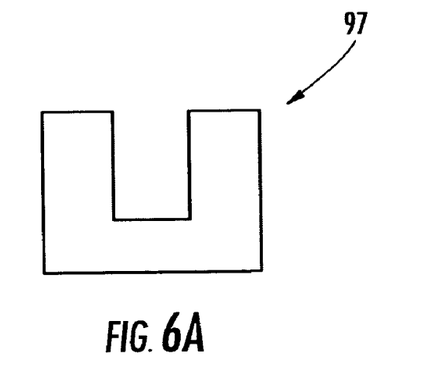
Figure 6B:
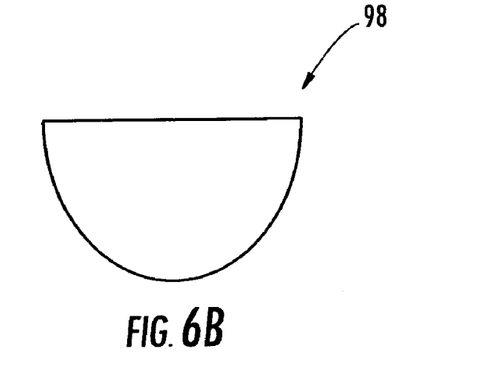
Figure 6C:
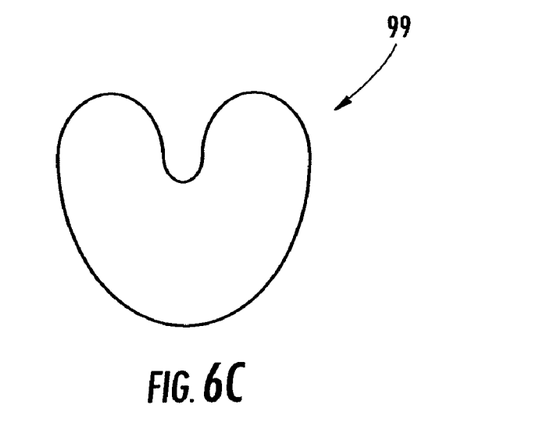

The main loop conductor 64 may take a plurality of shapes, widths, and thicknesses. By way of example, the main loop conductor 64 may also be generally circular, square, polygonal, etc., although other shapes may also be used such as a U-shape 97 (FIG. 6A), a semi-circle 98 (FIG. 6B), and a kidney bean shape 99 (FIG. 6C).

Moreover, the section 74 may also have notches, patches, etc. Patches may be used to add surface area so that the section 74 can shape the beam. It should be noted that, in the case of a cellular telephone, the beam should preferably be directed away from the telephone, i.e., perpendicular to the plane of the PCB 37. By way of example, the width of the antenna 45 may be about 7 cm or less, the height of the first section 61 may be about 1 to 3 cm, and the height of the second section 62 may be about 1 to 3 cm depending upon the given implementation. Of course, other dimensions may also be used.

Regarding the S11 impedance characteristics of the antenna 45, to provide wide bandwidth a good match is needed over the frequency range of interest. Thus, it is desirable to shrink the S11 circle and then move the shrunken circle to the 50 Ohm center point, as will be appreciated by those skilled in the art. The area 73, as well as other portions of the antenna 45, may be used to shrink and/or move the S11 circle, which is preferably done in a distributed fashion. Further, the matching network and meandering portions of the antenna 45 may also be used to move the S11 circle toward the desired 50 Ohm center point. The center of the shrunken S11 circle is less critical since it can advantageously be moved toward the 50 Ohm point as noted above in accordance with the present invention.

General speaking, the above-described antenna 45 allows various shapes and lengths to be utilized to provide appropriate electrical lengths and current distribution. Some shapes are simple delay lines, while other shapes are designed to affect current in a particular area. As noted above, given unlimited space, many of the shapes and geometries described above may not be necessary. However, it is within the space constrained environments of mobile wireless communications devices, such as cellular telephones, where the above-described antenna features are particularly advantageous for providing desired performance over multiple operating bands.

Various changes in the basic layout of the antenna 45 may be made in certain embodiments. By way of example, the tuning branch 72 may be moved so that it extends from section 74 instead of area 73. Other changes are also possible, as will be appreciated by those skilled in the art.

Figure 7:
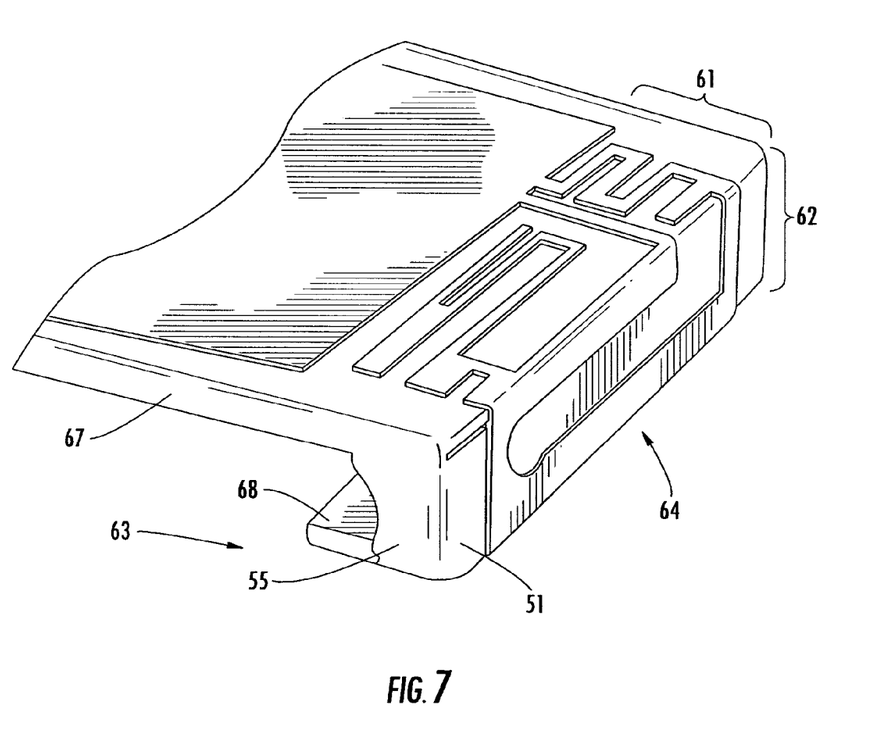
FIG. 7 is a perspective view of an embodiment of a dielectric substrate and associated antenna for use in the mobile wireless communications device of FIG. 1.

The PCB 67 has a first surface on which the circuitry 48 is positioned, and a second surface on which the ground plane conductor 69 is positioned. Preferably, the portions of the main loop conductor 64 on the overhang portion 68 of the L-shaped dielectric extension 63 are relatively positioned so as not to overlap the ground plane conductor 69. This has been found to provide enhanced antenna performance characteristics. Similarly, it is also preferable that none of the first, second or tuning branch conductors 70, 71, 72 overlap the ground plane conductor 69.

Figure 11:
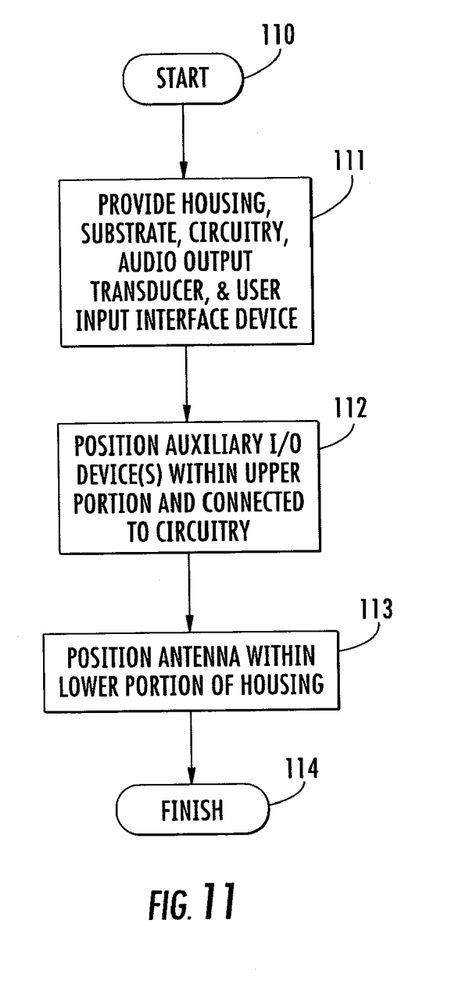
FIGS. 11 and 12 are flow diagrams of methods for making a mobile wireless communications device in accordance with the present invention.

A first method aspect of the invention for making a mobile wireless communications device 20 is now described with reference to FIG. 11. The method begins (Block 110) with providing a housing 21 having an upper portion 46 and a lower portion 47, a dielectric substrate 67 carried by the housing, circuitry 48 carried by the dielectric substrate, an audio output transducer 49 carried by the upper portion of the housing and connected to the circuitry, and a user input interface device (e.g., the keypad 23) carried by the housing and connected to the circuitry, at Block 111. The method further illustratively includes positioning at least one auxiliary input/output device 50 within the upper portion 46 of the housing 21 and connected to the circuitry 48, at Block 112, and positioning an antenna 45 within the lower portion 47 of the housing and comprising a pattern of conductive traces on the dielectric substrate, at Block 113, thus concluding the illustrated method (Block 114).

Figure 12:
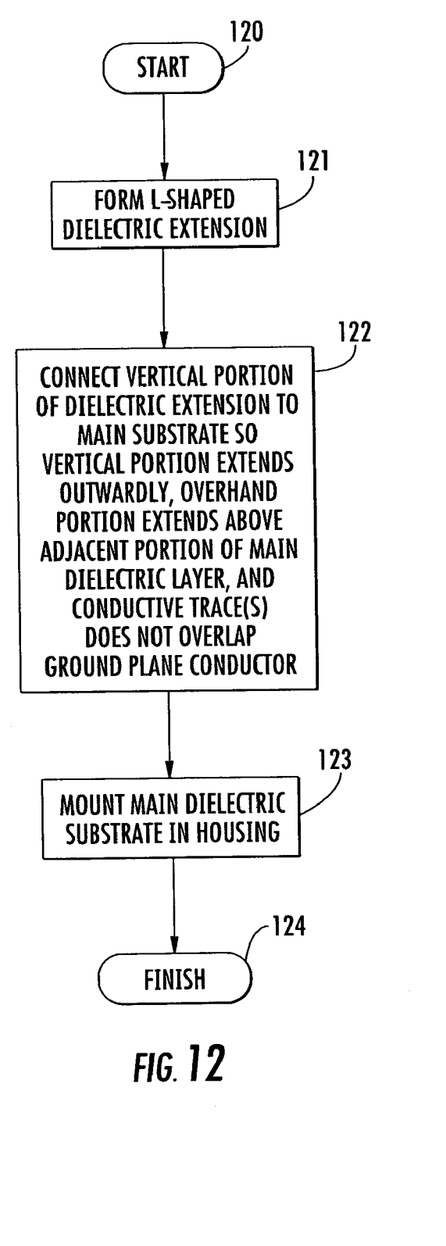

Another method aspect of the invention for making a mobile wireless communications device 20 is now described with reference to FIG. 12. The method begins (Block 120) with forming an L-shaped dielectric extension 63 comprising a vertical portion 51 and an overhang portion 68 extending outwardly from the vertical portion, with at least one conductive trace on the overhang portion, at Block 121. The method further illustratively includes connecting the vertical portion 51 of the L-shaped dielectric extension 63 to a main dielectric substrate 67 so that the vertical portion extends outwardly therefrom, so that the overhang portion 68 extends above an adjacent portion of the main dielectric substrate 67, and the at least one conductive trace does not overlap a ground plane conductor 69 on the dielectric substrate, at Block 122. Further, the main dielectric substrate 67 may be mounted in a housing 21, at Block 123, thus concluding the illustrated method (Block 124). Of course, it will be appreciated by those of skill in the art that the order of steps described in the above-noted methods is merely exemplary, and various steps may be performed in different orders in different embodiments.

Another example of a hand-held mobile wireless communications device 1000 that may be used in accordance the present invention is further described in the example below with reference to FIG. 13. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 13:
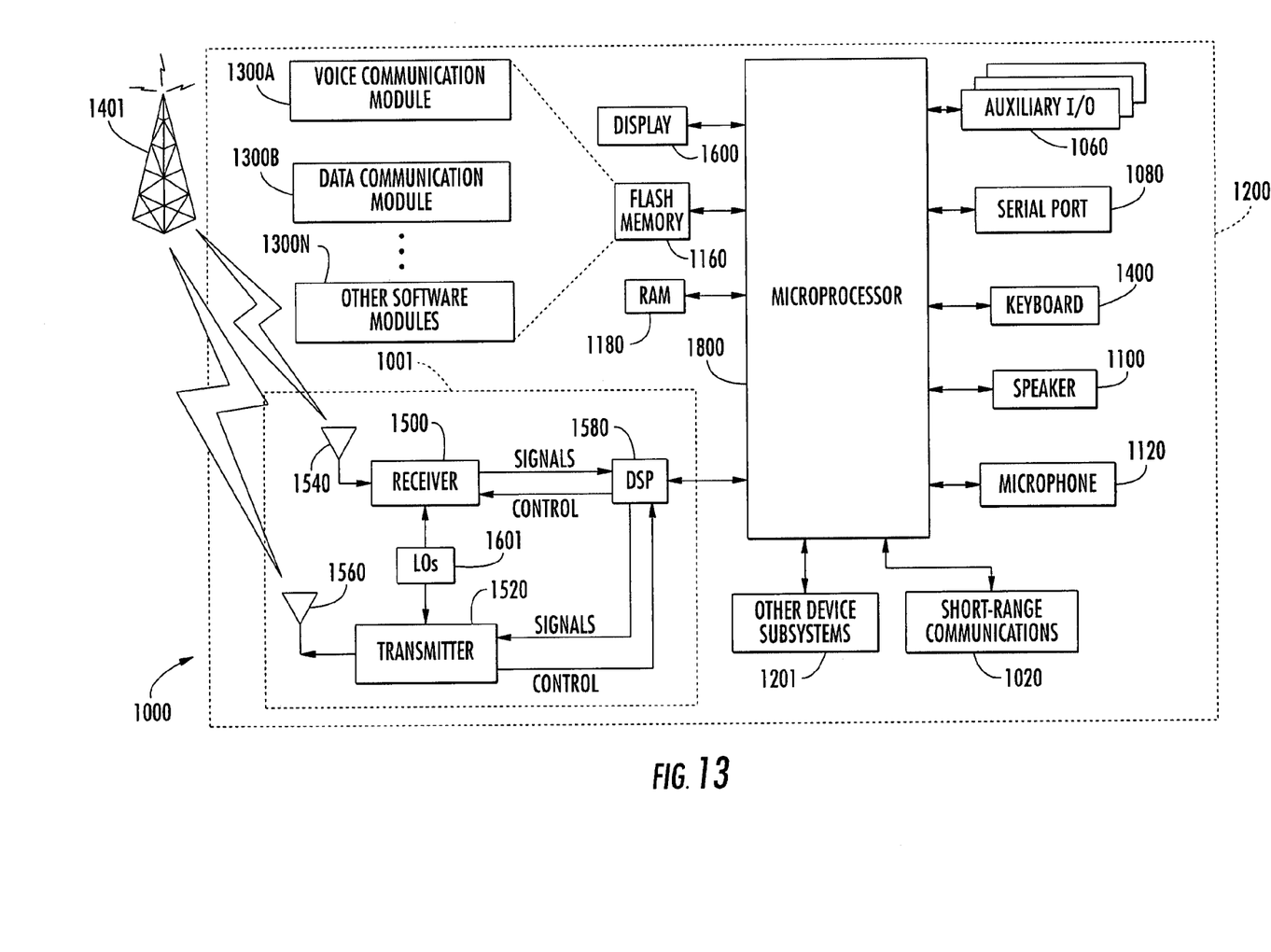
FIG. 13 is a schematic block diagram of an exemplary mobile wireless communications device for use with the present invention.

In addition to the processing device 1800, other parts of the mobile device 1000 are shown schematically in FIG. 13. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A–1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion.

Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a housing;
   a main dielectric substrate carried by said housing;
   circuitry carried by said main dielectric substrate;
   a ground plane conductor on said main dielectric substrate;
   an L-shaped dielectric extension comprising a vertical portion extending outwardly from said main dielectric substrate and an overhang portion extending outwardly from said vertical portion and above an adjacent portion of said main dielectric substrate; and
   a main loop antenna conductor comprising at least one conductive trace being relatively positioned on the overhang portion of said L-shaped dielectric extension so as not to overlap said ground plane conductor.

2. The mobile wireless communications device of claim 1 wherein said main dielectric substrate has opposing first and second surfaces, wherein said ground plane conductor is on the first surface, and wherein said vertical portion of said L-shaped dielectric extension extends outwardly from said second surface.

3. The mobile wireless communications device of claim 1 wherein said at least one conductive trace extends over said vertical portion of said L-shaped dielectric extension and has a gap therein defining first and second ends of said main loop antenna conductor.

4. The mobile wireless communications device of claim 3 further comprising:
   a first branch conductor on said main dielectric substrate having a first end connected adjacent the first end of said main loop antenna conductor and having a second end defining a first feed point; and
   a second branch conductor on said main dielectric substrate having a first end connected adjacent the second end of said main loop antenna conductor and a second end defining a second feed point.

5. The mobile wireless communications device of claim 4 further comprising a tuning branch conductor on said main dielectric substrate connected to said main loop antenna conductor between the respective first ends of said first and second branches.

6. The mobile wireless communications device of claim 1 wherein said main loop antenna conductor has at least one tuning feature therein.

7. The mobile wireless communications device of claim 1 wherein said housing has an upper portion and a lower portion, and further comprising an audio output transducer carried by the upper portion of said housing and connected to said circuitry; and wherein said L-shaped dielectric extension is adjacent the lower portion of said housing.

8. The mobile wireless communications device of claim 1 wherein said circuitry comprises a wireless transceiver connected to said main loop antenna conductor.

9. A mobile wireless communications device comprising:
   a housing;
   a main dielectric substrate carried by said housing and having opposing first and second surfaces;
   a ground plane conductor on the first surface of said main dielectric substrate;
   circuitry carried by said main dielectric substrate on the second surface thereof;
   an L-shaped dielectric extension comprising a vertical portion extending outwardly from the second surface of said main dielectric substrate and an overhang portion extending outwardly from said vertical portion and above an adjacent portion of said main dielectric substrate; and
   a main loop antenna conductor comprising at least one conductive trace being relatively positioned on the overhang portion of said L-shaped dielectric extension so as not to overlap said ground plane conductor;
   said main loop antenna conductor having at least one tuning feature therein.

10. The mobile wireless communications device of claim 9 wherein said at least one conductive trace extends over said vertical portion of said L-shaped dielectric extension and has a gap therein defining first and second ends of said main loop antenna conductor.

11. The mobile wireless communications device of claim 10 further comprising:
- a first branch conductor on said main dielectric substrate having a first end connected adjacent the first end of said main loop antenna conductor and having a second end defining a first feed point; and
- a second branch conductor on said main dielectric substrate having a first end connected adjacent the second end of said main loop antenna conductor and a second end defining a second feed point.

12. The mobile wireless communications device of claim 11 further comprising a tuning branch on said main dielectric substrate conductor connected to said main loop antenna conductor between the respective first ends of said first and second branches.

13. The mobile wireless communications device of claim 9 wherein said housing has an upper portion and a lower portion, and further comprising an audio output transducer carried by the upper portion of said housing and connected to said circuitry; and wherein said L-shaped dielectric extension is adjacent the lower portion of said housing.

14. The mobile wireless communications device of claim 9 wherein said circuitry comprises a wireless transceiver connected to said main loop antenna conductor.

15. A method for making a mobile wireless communications device comprising:
- forming an L-shaped dielectric extension comprising a vertical portion and an overhang portion extending outwardly from the vertical portion, with at least one conductive trace on the overhang portion;
- connecting the vertical portion of the L-shaped dielectric extension to a main dielectric substrate so that the vertical portion extends outwardly therefrom, the overhang portion extends above an adjacent portion of the main dielectric substrate, and the at least one conductive trace does not overlap a ground plane conductor on the dielectric substrate; and
- mounting the main dielectric substrate in a housing of the mobile wireless communications device.

16. The method of claim 15 wherein the main dielectric substrate has opposing first and second surfaces, wherein the ground plane conductor is on the first surface, and wherein connecting the vertical portion comprises connecting the vertical portion to the first surface.

17. The method of claim 15 further comprising positioning the at least one conductive trace to extend over the vertical portion of the L-shaped dielectric extension and to have a gap therein defining first and second ends of a main loop antenna conductor.

18. The method of claim 17 further comprising:
- forming a first branch conductor on the main dielectric substrate having a first end connected adjacent the first end of the main loop antenna conductor and having a second end defining a first feed point; and
- forming a second branch conductor on the main dielectric substrate having a first end connected adjacent the second end of the main loop antenna conductor and a second end defining a second feed point.

19. The method of claim 18 further comprising forming a tuning branch conductor on the main dielectric substrate connected to the main loop antenna conductor between the respective first ends of the first and second branches.

20. The method of claim 15 wherein the housing has an upper portion and a lower portion, and further comprising:
- positioning an audio output transducer adjacent the upper portion of the housing and connected to the circuitry; and
- positioning the L-shaped dielectric extension adjacent the lower portion of the housing prior to connecting the vertical portion to the main dielectric substrate.

* * * * *